US010223891B2

(12) United States Patent
Chlubek et al.

(10) Patent No.: US 10,223,891 B2
(45) Date of Patent: Mar. 5, 2019

(54) REAL-TIME MULTI-COMPONENT WEB BASED TRAVEL SAFETY SYSTEM AND METHOD

(76) Inventors: Peter Chlubek, Wellingborough (GB); Robert Davis, Fort Myers, FL (US); John Chlubek, Wanneroo (AU); Michael Chlubek, Hillarys (AU)

(*) Notice: Subject to any disclaimer, the term of this patent is extended or adjusted under 35 U.S.C. 154(b) by 0 days.

(21) Appl. No.: 11/804,542

(22) Filed: May 17, 2007

(65) Prior Publication Data
US 2007/0273499 A1    Nov. 29, 2007

Related U.S. Application Data

(60) Provisional application No. 60/747,473, filed on May 17, 2006.

(51) Int. Cl.
| | |
|---|---|
| G06Q 50/26 | (2012.01) |
| G08B 21/10 | (2006.01) |
| G08B 27/00 | (2006.01) |
| G08B 31/00 | (2006.01) |

(52) U.S. Cl.
CPC ............ G08B 21/10 (2013.01); G06Q 50/26 (2013.01); G08B 27/001 (2013.01); G08B 31/00 (2013.01)

(58) Field of Classification Search
CPC ...... G08B 21/10; G08B 27/001; G08B 31/00; G06Q 50/26
USPC ..................................................... 340/539.11
See application file for complete search history.

(56) References Cited

U.S. PATENT DOCUMENTS

| | | | | |
|---|---|---|---|---|
| 6,721,652 B1* | 4/2004 | Sanqunetti | ................ | G06T 3/60 701/468 |
| 2005/0216583 A1* | 9/2005 | Cole | .................. | G06Q 20/3224 709/224 |
| 2005/0278118 A1* | 12/2005 | Kim | ........................ | G01C 21/26 701/469 |
| 2006/0136090 A1* | 6/2006 | Koromyslov | ............ | G08G 1/09 700/200 |
| 2006/0143959 A1* | 7/2006 | Stehle | ............... | G06F 17/30867 40/600 |
| 2007/0188318 A1* | 8/2007 | Cole | ....................... | G06Q 10/08 340/539.13 |

(Continued)

Primary Examiner — Kerri L McNally
(74) Attorney, Agent, or Firm — Carlson, Gaskey & Olds

(57) ABSTRACT

A real-time system and method that monitors and maintains greatly enhanced safety and security for travelers and corporations by creating a multi layered and integrated system of multi faceted intelligence collection and dissemination, global electronic monitoring, locating and tracking technology, telecommunications, multi channel electronic distribution of relevance-parameterized advice and information to travelers with full acknowledgements and audit trail of critical alert messages both pushed to the traveler or traveler-requested, individual and corporate global security services, emergency response, search and rescue operations initiated either/both by monitor processes or by the traveler and a wide range of travel safety and security related ancillary services, all coordinated under the management of a central international command and control center with regional sub control centers throughout the world. All these component parts are brought together by the method and process to work synergistically in a way not previously described or existing.

6 Claims, 12 Drawing Sheets

(56) References Cited

U.S. PATENT DOCUMENTS

2007/0194944 A1* 8/2007 Galera ..................... F16P 3/14
                                                    340/686.6

* cited by examiner

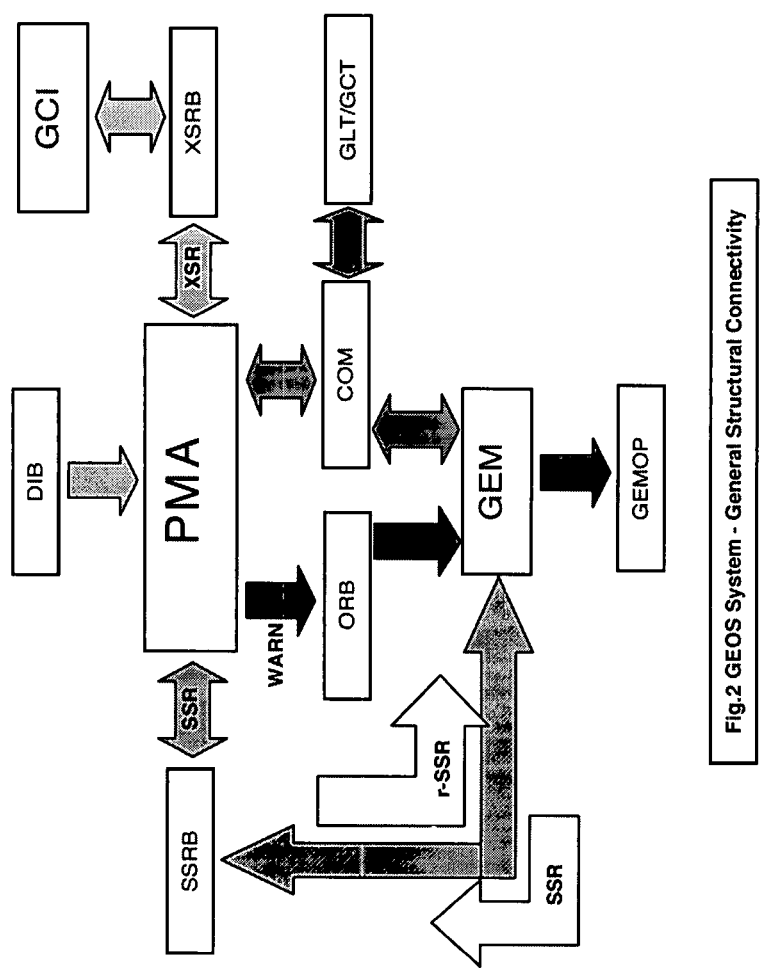
Fig.2 GEOS System - General Structural Connectivity

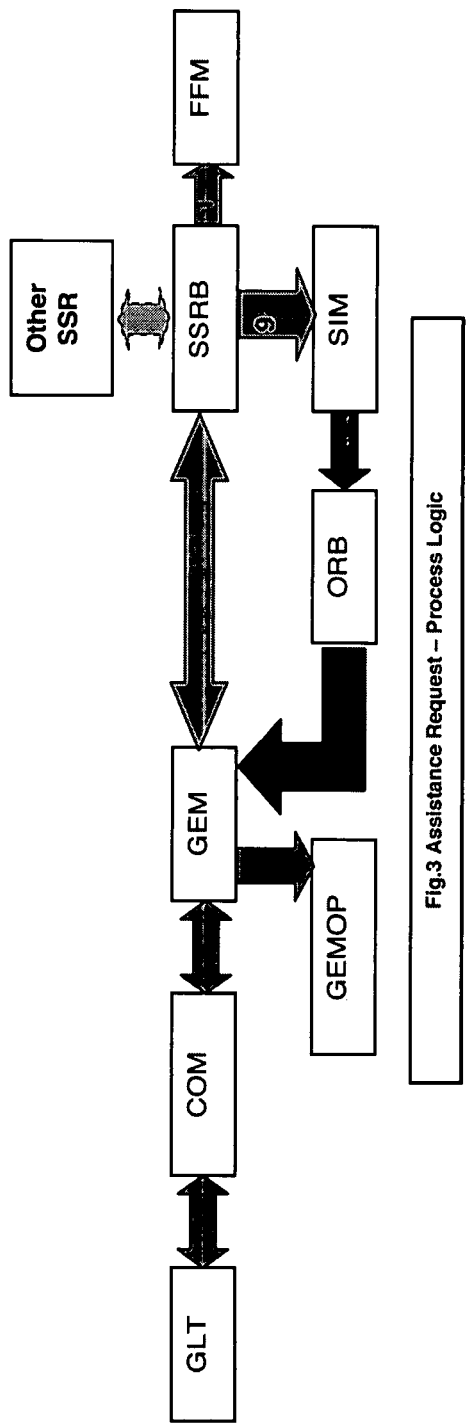
Fig.3 Assistance Request – Process Logic

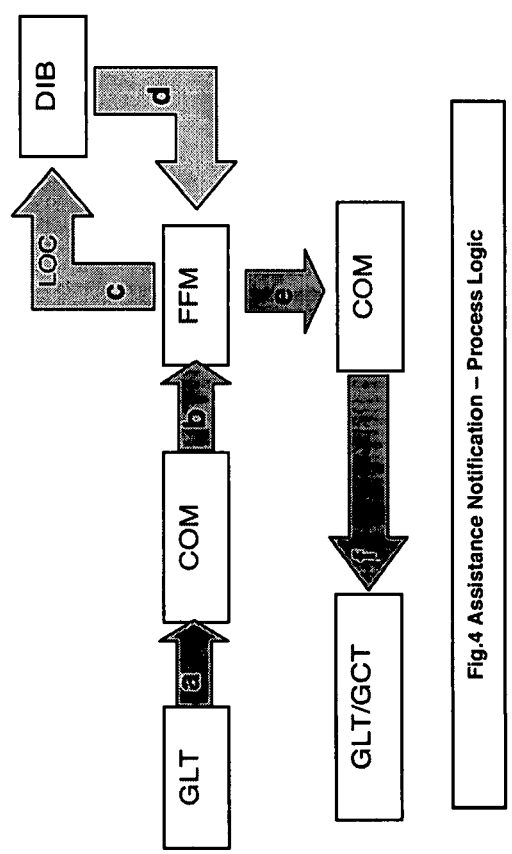

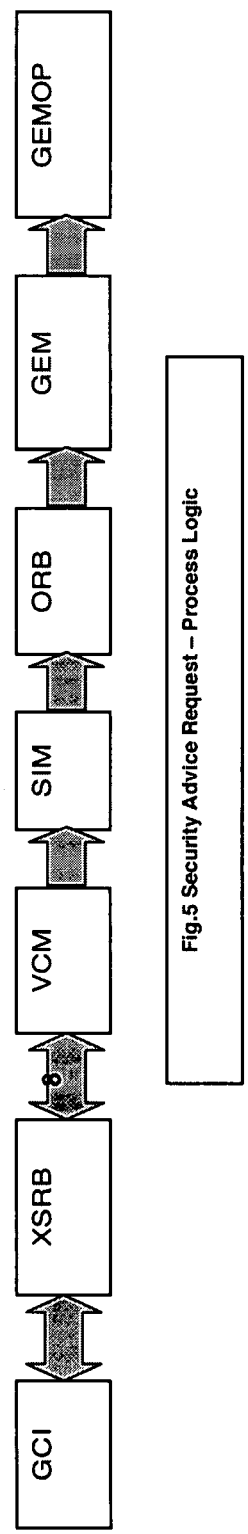

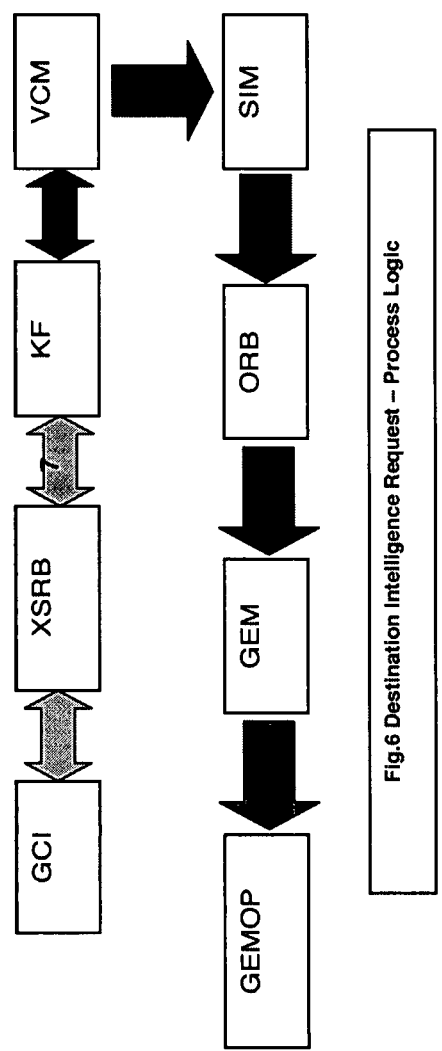
Fig.6 Destination Intelligence Request – Process Logic

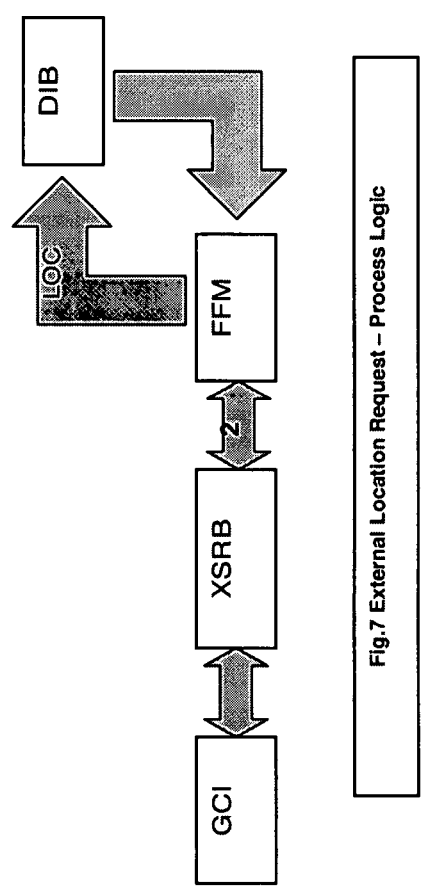

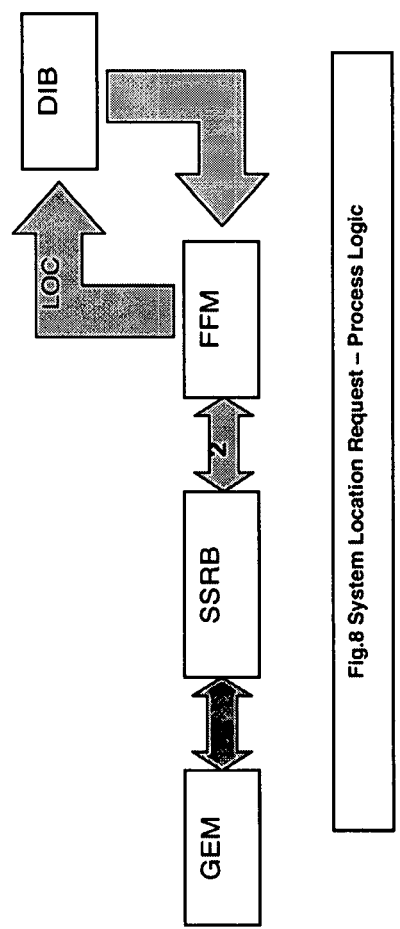

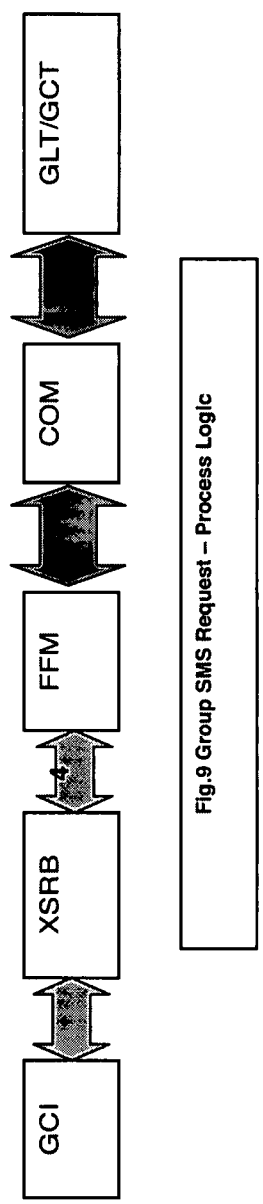

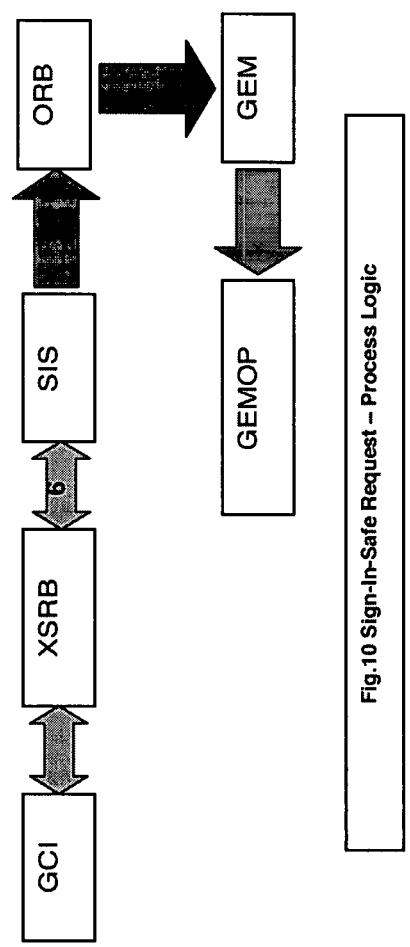

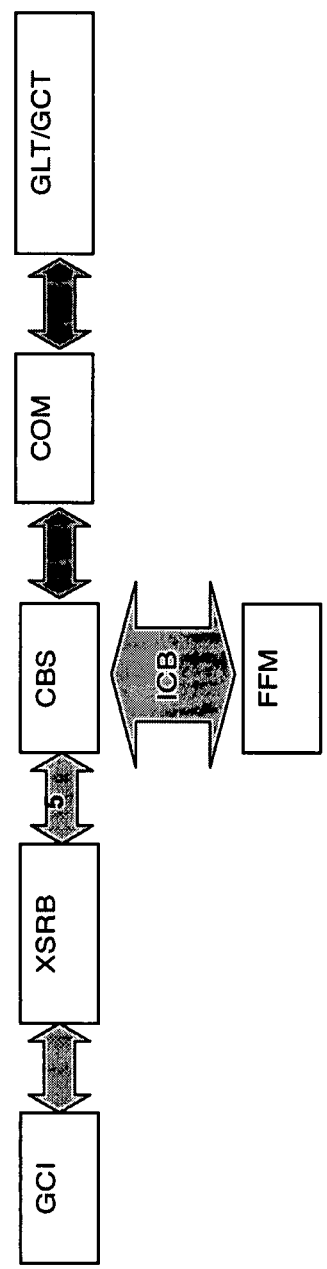

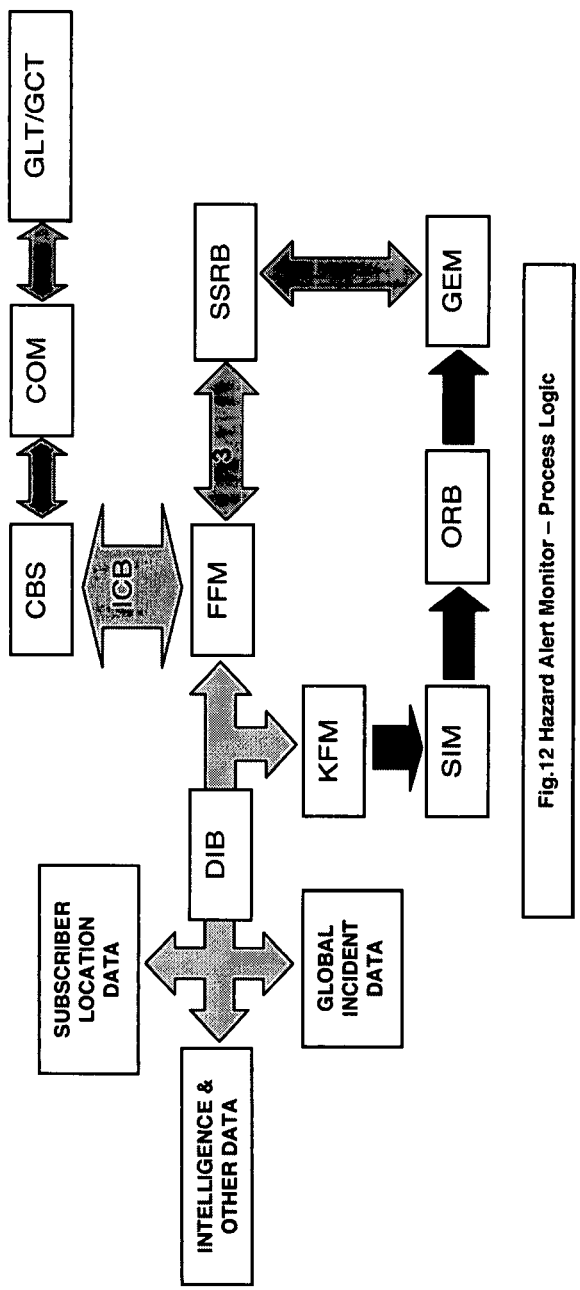

REAL-TIME MULTI-COMPONENT WEB BASED TRAVEL SAFETY SYSTEM AND METHOD

CROSS-REFERENCE TO RELATED APPLICATIONS

The present utility patent application claims the benefit of provisional application No. 60/747,473 filed May 17, 2006.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

Field of the Invention

The present invention relates to security and warning systems and particularly to a web-based travel safety system which comprises a real-time method and process that monitors and maintains greatly enhanced safety and security for travelers and corporations by creating a multi-layered and integrated system of multi-faceted intelligence collection and dissemination, global electronic monitoring, locating and tracking technology, telecommunications, multi-channel electronic distribution of relevance-parameterized advice and information to travelers with full acknowledgements and audit trail of critical alert messages both pushed to the traveler or traveler-requested, individual and corporate global security services, emergency response, disaster alerts, search and rescue operations initiated either/both by monitor processes or by the traveler and a wide range of travel safety and security related ancillary services, all coordinated under the management of a central international command and control center with regional sub control centers throughout the world; all components are brought together by the method and process to work synergistically.

Description of Related Art Including Information Disclosed Under 37 CFR 1.97 and 1.98

There are many reasons in today's world which cause concern over the safety and security of travelers. Airports are a prime example of locations which may put a traveler at risk. Security systems are currently in use in airports to isolate individuals or items posing a security risk, but these are not enough to deter someone intent on creating harm.

U.S. Pat. No. 6,028,514, issued Feb. 22, 2000 to Lemelson, concerns a personal emergency, safety warning system and method for monitoring a geographic person location, periodically warning a person of emergency situations in the geographic location, and transmitting requests for assistance in emergency situations. The system comprises a warning unit that is carried by the person or that is located in mobile units or in buildings or houses. The warning unit includes a geographic satellite receiver, a receiver circuit that receives broadcast warning signals defining dangerous situations and geographic locations of the situations, a computer controller including a processor and a memory, an alarm indicator that indicates when the person is in danger, and a transmission circuit that generates and transmits signals requesting assistance and signals warning of the dangerous situations in a vicinity of the person carrying the portable warning unit along with the current geographic location of the person. The system further comprises a command center. The command center includes a database computer having a database storage unit, a transmitter for broadcasting signals to the unit(s), a receiver for receiving signals, a transmitter for transmitting signals to emergency response units and centers, and other such communication devices. The system uses the unit(s) to monitor and communicate with the person using it. The unit(s) interfacingly communicate with the command center. Signals indicative of a dangerous situation and a geographic situation location are transmitted from the command center to the unit(s). The geographic person location is compared with the geographic situation location indicated in the received signal from the command center. Expert system rules are used to determine the dangerous situation and a degree(s) of danger index for the person(s) near or at the geographic situation location. Signals are received and transmitted to and from the monitor/response center via a transmit/receive radio and antenna system. The radio system, for example, is in the form of a cellular telephone system or other suitable radio communication devices for communications with telecommunications. The Lemelson patent describes a system to track and locate individuals by a device (cell phone) and to send them alert messages of dangerous situations in an area defined by the geographical location of the individual. The described system also has the ability to receive emergency distress signals from the device.

U.S. Patent Application #20070052533, published Mar. 8, 2007 by Glazer, describes methods and apparatus for providing alerts or warnings of a variety of hazards. A warning system is disclosed that continuously operates and is configured to receive and analyze advisory notices from publicly and/or privately available broadcasts that do not require registration of the device and/or user. Continuous operation provides the warning system user with appropriate warnings, even when the user cannot personally monitor the advisory notices, such as when the user is asleep. The Glazer invention relates solely to the communication of alert messages to an individual using locating technology to identify whether the user is within a 'risk' area which has been defined by analyzing intelligence.

U.S. Patent Application #20070072583, published Mar. 29, 2007 by Barbeau, discloses an emergency reporting and locator system adapted for GPS-enabled wireless devices. Global Positioning System (GPS) technology is and Location Based Services (LBS) are used to determine the exact location of a user and communicate information relating to the emergency status of that location. The user initiates the locator application via a wireless device and their physical location information is automatically transferred to a server. The server then compares the user's location with Geographic Information System (GIS) maps to identify the emergency status associated with their location. Once the server has calculated the current emergency status, the information is automatically returned to the user, along with emergency instructions. The Barbeau invention relates solely to the sending of alert messages at times of emergency, or the status of a given area if requested by the end user. The persons to whom a message is sent are selected by relating their location, as indicated by a GPS device, to the location of an emergency situation.

U.S. Patent Application #20060265489, published Nov. 23, 2006 by Moore, claims disaster management using an enhanced syndication platform. The invention relates to hardware, software and electronic service components and systems to provide large-scale, reliable, and secure foundations for distributed databases and content management systems, combining unstructured and structured data, and allowing post-input reorganization to achieve a high degree of flexibility. This system may be combined with various syndication techniques to provide a platform for disaster preparation, response, and relief. The invention described may allow disaster relief data to be stored in a syndication format, processed, and published through a plurality of disaster management data feeds. The syndicated content may be used by disaster relief participants in the preparation, response and relief efforts associated with a disaster.

Two U.S. patents, U.S. Pat. No. 6,559,769 issued May 6, 2003 and U.S. Pat. No. 6,873,261 issued Mar. 29, 2005 both to Anthony, are for an early-warning security system for monitoring and tracking in near real-time or real-time the activities and movements associated with prescribed personnel, personal property, mobile vehicles, and buildings. The system comprises a plurality of in situ local controllers having a microprocessor and a coordinated plurality of conspicuous and clandestine digital video cameras for continuously producing digital audio and visual signals, uplinking such signals via a suitable wireless telecommunications device to a satellite, general packet radio service, the Internet, intranet or extranet, and then downlinking these signals to a plurality of control centers for recording and analysis thereof. Uplinking of these digital signals may occur continuously or may be activated by a manual or predefined trigger event. Preventative or remedial action is immediately taken when perturbations from normal behavior or activities are observed in the recorded audio and visual signals The Anthony patents relate to the surveillance of individuals, vehicles etc by the use of digital cameras and audio. The information gathered is transmitted to a central station for analysis and reaction.

U.S. Pat. No. 6,509,833, issued Jan. 21, 2003 to Tate, provides a method and a system for providing a warning alert to subscribers of a telecommunication system. In one aspect, the warning system includes a central switch and a remote switch, each switch coupled to a different plurality of subscribers to be contacted by the emergency notification provider that issues the emergency warning alert. In another aspect, the warning system contains a ringing tones database having different ringing tones corresponding to different emergency conditions, where an appropriate ringing tone is select by the telecommunication system and routed to the subscribers depending on the type emergency for which the emergency notification provider is providing the warning. In another aspect, a method of distributing a warning alert is disclosed in which a warning alert is selected from a number of warning alerts corresponding to a number of different emergency conditions, the telecommunication system receives the warning alert, selects a set of subscribers to which the warning alert is to be distributed, selects a ringing tone appropriate to the warning alert type and routes the ringing tone to the selected subscribers. In another aspect, the above method is disclosed that further includes a method for billing an appropriate government agency or local municipality for the emergency notification service. The Tate patent relates solely to the distribution of warning or alert messages to devices such as cell phones. The selection of persons to receive the message is achieved by either pre-determined call groups, or geographic location established by GPS.

U.S. Pat. No. 6,868,266, issued Mar. 15, 2005 to Yen, shows a multi-purpose safety management system comprising a smart all-purpose expert management system which integrates a global positioning system, a digital remote monitoring system, the Internet, and various kinds of communication networks like the satellite communication network, the public switch telephone network, and the mobile phone system. The smart all-purpose expert management system can provide all-purpose personal life real-time services for the user. The service items include global personal safety guard, home safety guard, personal exclusive database management, personal life secretary, global communication service of single telephone number, communication group setting, and so on The Yen patent describes the tracking and locating of a cell phone by a control center and the ability to send an automatic distress signal. Remedial action is then initiated.

U.S. Pat. No. 7,088,252, issued Aug. 8, 2006 to Weekes, discloses systems and apparatus for personal security. A personal security device is provided which includes a wireless transmitter operable to transmit information pertaining to a user to a monitoring network. A monitoring network may communicate with a particular user or users via the user interface of the personal safety module. For example, the monitoring network may send broadcast messages, e.g., warnings or alerts, to users via output devices on the user interface. Further, monitoring network may provide for one or two-way communications with a particular user via user interface. The user interface may function as a cellular telephone for communication with hub or other entities. The Weekes patent relates to transmission of alert messages to an individual wearing a harness and a receiving device (cell phone). The user can of course communicate with a monitoring station by this two-way device. The main point of the invention seems to relate to a harness worn by the user containing the device. If the device is removed without authority of the user a sensor in the harness facilitates the transmission of a distress signal to the monitoring station.

U.S. Pat. No. 6,411,207, issued Jun. 25, 2002 to Shaffer, indicates a personal alert device for a user which includes a portable housing to be carried by the user, a processor in the housing, and at least one sensor connected to the processor for detecting a possible physical threat to the user. The processor generates an alert message relating to a recommended course of action for the user to avoid the possible physical threat. The alert message may be an audible speech message, and a visual message displayed on a display connected to the processor. Since a person can be exposed to a variety of physical threats on any given day, the personal alert device carried by the user provides reliable detection of a possible physical threat, and by generating an alert message the user receives a recommended course of action to avoid the possible physical threat. Networking may be accomplished via a broadband local area network or a cellular network. In the Shaffer patent, the user carries or wears a device that contains one or a number of sensors. The sensors can detect dangers such as dangerous, gasses or a rapid change in air pressure indicating possible weather danger. The device then sends a message to a monitoring station who by voice, or text messaging advise the user of appropriate action. The device can also be remotely connected to such things as fire alarms in buildings where the user gets a personal warning of a fire alarm etc in case he cannot hear it and may also check the status of the fire alarm system by the device without having to ask, for instance, maintenance staff.

U.S. Pat. No. 6,838,998, issued Jan. 4, 2005 to Brown, puts forth a multi-user Internet-based personal tracking system for tracking the position of a portable location unit (such as a cell phone) by a remote user comprising a web host connected to the Internet having a computer storage medium, a portable location unit having a processor for receiving geo-position information, and generating geo-position data representing the position of said location unit, a transceiver included in said, location unit for transmitting said position signal to said web host in response to a call signal being received from said web host, a power supply for supplying power to said processor and said transceiver; and a computer program residing on said web host having an input module for receiving a tracking request signal from the remote user via the Internet, a processing module for processing said tracking request signal, and a communication module for initializing communication with said location unit in response to tracking said request signal, and a location module for outputting said call signal to said location unit and for receiving said geo-position data from said location unit; and a display module for outputting said position dataset to the remote user via the Internet for display of the location unit's position at the remote user's site. The Brown patent relates to technology that will provide the location of a GPS instrument when interrogated remotely. Family or company etc can, by accessing the Internet and entering access codes receive information that confirms the present location of the persons carrying a GPS device.

U.S. Pat. No. 7,209,731, issued Apr. 24, 2007 to Choi, illustrates a protection method using a mobile communication terminal, and in particular a member protection method using a mobile communication terminal which is capable of quickly coping with an emergency situation in such a manner that when a certain situation, for example, a member with a mobile communication terminal having a positioning function rides in taxi or is in a strange building, and moving information such as an engaged time when the situation is ended and a taxi registered number is registered in a central control server, a member's position is recognized and temporarily stored. In the case that a movement lifting notice is not received from a member until an engaged time, moving information such as a member's position is transmitted to a mobile communication terminal of a security staff. In the Choi patent, the user manually calls a monitoring station by cell phone and states that they are entering into a possible security risk, i.e traveling by taxi or entering a strange building. Details of the taxi license plate or address of the building are provided to the monitoring station together with a period of time during which the user must call back and cancel the possible security danger. i.e they leave the taxi or building. In the event that the situation is not cancelled and the time period expires the monitoring station respond and take appropriate action. The users cell phone is tracked to assist in rendering assistance. The main aspect of this patent appears to be the manual system for the user to request monitoring of the situation by requiring a further response during the stated time period.

U.S. Pat. No. 6,716,101, issued Apr. 6, 2004 to Meadows, claims a system and method for monitoring the geographical location of a subscriber's mobile cellular telephone, and for providing the location information to an authorized user through the World Wide Web. The geographical location of the subscriber's mobile cellular telephone is tracked using registration signals transmitted over the control channel by the cellular telephone. This information is supplied to a geographical location coordinator system, which determines the geographical coordinates for the cellular telephone. A database stores the geographical location information along with a subscriber's telephone number and account code. The database is updated to track the movement of the cellular telephone user across a geographical area. The Meadows patent sets out a basic concept of tracking cell phones with location information available to authorized users via the Internet.

U.S. Pat. No. 6,331,825, issued Dec. 18, 2001 to Ladner, describes a mobile locator system which comprises a locator device, a control center, a workstation and a computerized interface. The control center and the locator device are configured to communicate via cellular and pager signals. The control center includes modems, a router, a paging server, a communication server, MIN tracking circuit, a data manager, a data base, a GIS server; a mail server, a global network (such as the Internet), and a customer interface server. The Ladner patent details tracking and locating of GPS cell phones.

What is needed is a real-time Web-based multi-unit travel safety system and method which utilizes both locating technology and alert messaging and adds many more component parts to achieve much greater safety levels through its multiple components working in synergy, which results in a comprehensive and global process providing a high level of traveler safety in a unified system never before created and with results not previously achievable.

BRIEF SUMMARY OF THE INVENTION

An object of the present invention is to provide a real-time Web-based multi-unit travel safety system and method which utilizes both locating technology and alert messaging and adds many more component parts to achieve much greater safety levels through its multiple components working in synergy, which results in a comprehensive and global process providing a high level of traveler safety in a unified system never before created and with results not previously achievable.

Another object of the present invention is to provide a real-time multi-component system and method to monitor and maintain the safety and security of a traveler, whether as an individual, part of a group or in a broader corporate context, while traveling, operating or working internationally and domestically.

An added object of the present invention is to provide a real-time Web-based multi-component system and method that is easily adaptable for professionals and workers in various industries both to monitor the location of a worker, and present the worker with information about his current location.

A further object of the present invention is to provide a real-time Web-based multi-component system and method that allows mobile workers, such as police, probation officers, social services workers, to leave their vehicle communications systems and still have access to information about their locale and a means to communicate their locale to their home offices.

In brief, the present invention comprises a real-time multi-component system and method that monitors and maintains the safety and security of a traveler, whether as an individual, part of a group or in a broader corporate context, while traveling, operating or working internationally and domestically. GEOS System acquires Global Incident Data and traveler location data, both in real-time, and derived and/or obtained via satellite, terrestrial cellular and other techniques and methodologies. The system then responds to real-time service requests from authorized third parties, the traveler or from internal monitoring processes (external service requests or system service requests) in a way where the incoming data is used to modify the response to make it relevant and appropriate to the location of the traveler and to the travelers' situation. The system allows the traveler to plan appropriately by providing appropriate pre-travel advice related specifically to any intended itinerary. Once defined, the itinerary becomes a part of the parameter data, which is integrated with the monitoring function. In addition, the system can both recognize a developing health, security or other risk in real-time and automatically establish two-way electronic communication via a broad communications channel incorporating fully redundant-mobile text, email, voice and other messaging techniques to transmit and receive acknowledgement for appropriate pre-emptive advice direct to the traveler, as well as permit the traveler to signal an encountered risk, hazard or other event upon which GEOS System may initiate appropriate remedial steps ranging from appropriate advice to commencement of a search and rescue operation in the field.

An advantage of the present invention is that it provides a real-time Web-based multi-component system and method that utilizes both locating technology and alert messaging to provide a user with information about his current location.

Another advantage of the present invention is that it provides a real-time Web-based multi-component system and method that utilizes both locating technology and alert messaging to enhance the safety of a traveler or worker away from home.

An added advantage of the present invention is that it provides a real-time Web-based multi-component system and method that utilizes both locating technology and alert messaging that can be used locally, domestically, or internationally.

An ensuing advantage of the present invention is that it provides a real-time Web-based multi-component system and method that utilizes both locating technology and alert messaging that can be adapted to provide location-specific information applicable to any professional needs.

One more advantage of the present invention is that it provides a real-time Web-based multi-component system and method that utilizes both locating technology and alert messaging that alerts the user when he has entered an unsafe area.

An additional advantage of the present invention is that it provides a real-time Web-based multi-component system and method that utilizes both locating technology and alert messaging that alerts the user of local and international incidents that may compromise the user's safety or security.

A further advantage of the present invention is that it provides a real-time Web-based multi-component system and method that utilizes both locating technology and alert messaging that allows the user to communicate his whereabouts to a monitoring system.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings:

FIG. 2 is a diagrammatic view of the general structural connectivity of the invention of FIG. 1;

FIG. 3 is a diagrammatic view of the process logic of the Assistance Request component of the invention of FIG. 1;

FIG. 4 is a diagrammatic view of the process logic of the Assistance Notification component of the invention of FIG. 1;

FIG. 5 is a diagrammatic view of the process logic of the Security Advice Request component of the invention of FIG. 1;

FIG. 6 is a diagrammatic view of the process logic of the Destination Intelligence Request component of the invention of FIG. 1;

FIG. 7 is a diagrammatic view of the process logic of the External Location Request component of the invention of FIG. 1;

FIG. 8 is a diagrammatic view of the process logic of the System Location Request component of the invention of FIG. 1;

FIG. 9 is a diagrammatic view of the process logic of the Group SMS (text message) Request component of the invention of FIG. 1;

FIG. 10 is a diagrammatic view of the process logic of the Sign-in-Safe component of the invention of FIG. 1.

FIG. 11 is a diagrammatic view of the process logic of the Critical Broadcast Request component of the invention of FIG. 1;

FIG. 12 is a diagrammatic view of the process logic of the Hazard Alert Monitor component of the invention of FIG. 1.

DETAILED DESCRIPTION OF THE INVENTION

Figure 1:
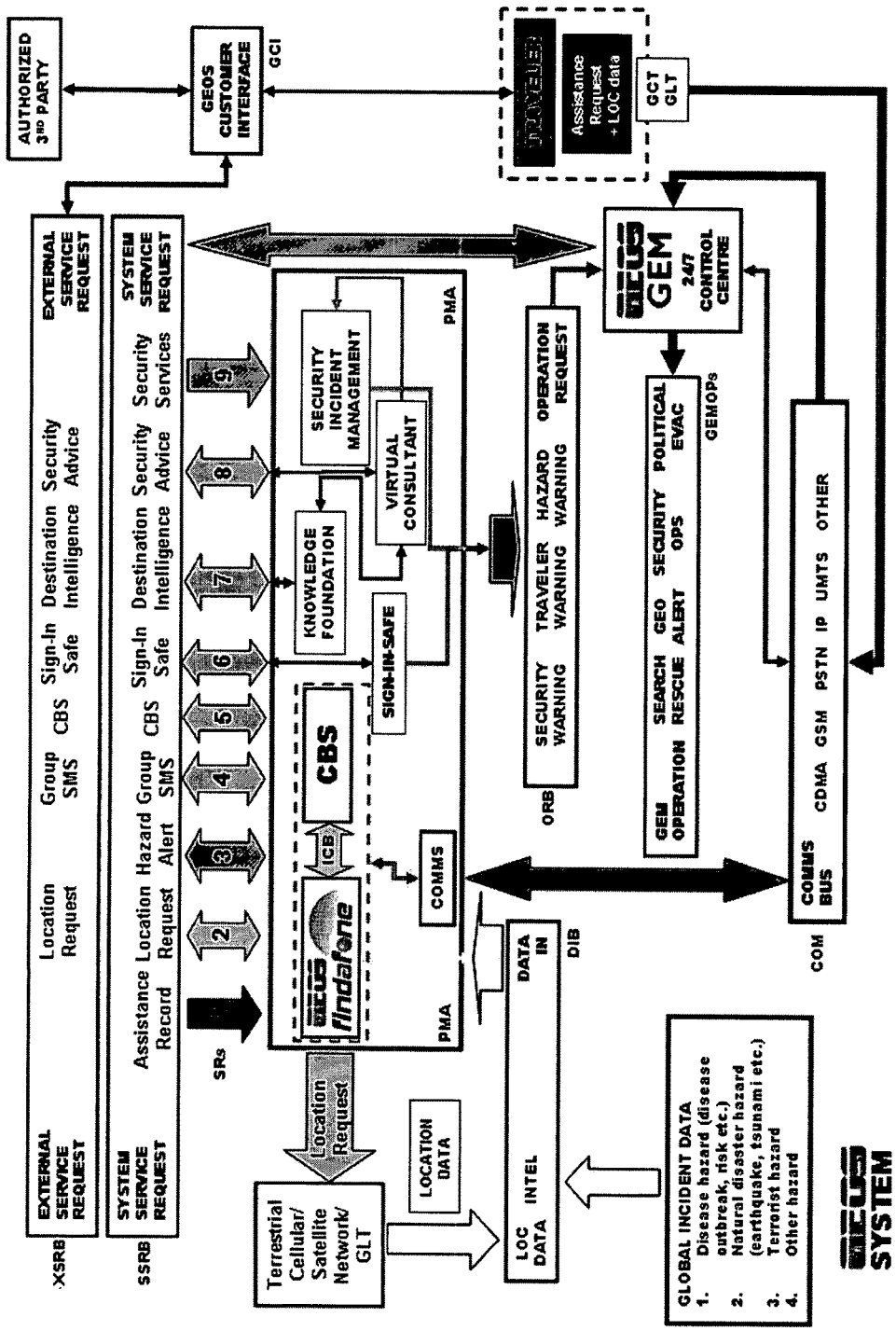
FIG. 1 is a diagrammatic view of the workings of the entire system of the present invention.

In FIGS. 1-12, a real-time multi component travel safety system monitors and maintains the safety and security of a traveler, as an individual, part of a group and in a broader corporate context, while traveling, operating and working internationally and domestically, the system comprising:

a multifunction Processing Module Array (PMA) comprising a plurality of interacting interconnected modules, the modules processing Service Requests and delivering appropriate outputs both within the system and to the external service-requesting entity;

a multifunction, programmable and customizable Data Input Bus comprising one of the modules of the Processing Module Array, the Data Input Bus receiving location data, global incident data including disease hazard, natural disaster hazard, terrorist hazard and other hazards, intelligence assessments and other data which are used as parameters controlling the system processes within the Processing Module Array;

a multifunction, programmable and customizable External Service Request Bus (XSRB) comprising another of the modules of the Processing Module Array, the External Service Request Bus accepting service requests, through a GEOS Customer Interface (GCI), from a traveler and from any authorized third party, both in real-time, and passing the service requests on to the Processing Module Array (PMA), the External Service Request Bus being bi-directional and, for some Service Requests, returning appropriate PMA outputs back, via the bi-directional GCI, to the traveler or an authorized third party;

a multifunction and multimedia Communications Bus (COM) comprising another module of the Processing Module Array, the Communications Bus managing communications of the system and its component parts with the external environment;

a multifunction Operation Request Bus (ORB) comprising another module of the Processing Module Array, the Operation Request Bus grouping warning outputs from the Processing Module Array and forwarding the warning outputs to a GEOS GEM Control Center;

a multifunction, programmable and customizable Global Emergency Monitoring (GEM) Center comprising another module of the Processing Module Array, the Global Emergency Monitoring Center responding to and processing Operation Requests from the PMA via the Operation Requests Bus (ORB), interacting with the PMA via the bi-directional SSR bus, responding to, coordinating and processing Traveler Assistance Requests from a GEOS Location Terminal (GLT) or GEOS Communications Terminal (GCT), the GEM initiating further appropriate GEM operations via a GEM Operations Bus (GEMOP bus), which may be supported by further SSRs;

a multifunction, programmable and customizable GEOS Customer Interface (GCI) comprising a bi-directional graphical interface, also accessible via the internet World Wide Web, which is the interface between the user and the System Processes (PROs);

a GEOS Communications Terminal (GCT) comprising an approved technological device enabling communications between the terminal and the other components of the GEOS System, the GCT establishing communications with the GEM and responding to CBS communications, both in real-time;

a GEOS Location Terminal (GLT) comprising an approved technological device transmitting it's location to the GEM or to the FFM, the GLT configured for simultaneously being a GCT;

to create a real-time multi component travel safety system that monitors and maintains the safety and security of a traveler, as an individual, part of a group and in a broader corporate context, while traveling, operating and working internationally and domestically.

The processes (PROs) within the PMA interact with the GEM and the external environment via a series of buses including Service Request Buses, Data Input Bus, Operation Request Bus, Communications Bus, the buses comprising logical and physical groupings of signaling paths which provide both clarity and efficiency to the functioning of the system, the utilization of buses in this way enabling the existence, and development of multiple logic structures within the same structural connectivity to give rise to possible multiple and different embodiments of the same system and to permit further development of individual system processes and their enhancement and changes to system logic within the structure of the system.

For example, the system processes could be connected directly without recourse to a bus structure, however, this would permit the definition of but one particular embodiment of the system, for example, the FFM, CBS, SIS and SIM modules could be connected directly to the GEM, similarly, the GEM could have it's own communications as well as the FFM and CBS modules. This would be a particular embodiment of the invention.

The system is programmed for being adapted, extended or reduced in scope, without its uniqueness and originality of concept and methodology being fundamentally changed so that the system is structured for learning and thus achieving a modification of process logic within the same structure. This may be achieved, for example, by modifying, adapting and adding to the PMA processes and the PMA logic in the light of further experience without altering the structural connectivity.

The system is programmed to communicate with satellite, terrestrial cellular and other techniques and methodologies to acquire Global Incident Data and traveler location data, both in real-time, and to respond to real-time service requests from authorized third parties, from the traveler and from internal monitoring processes in a way where the incoming data is used to modify the response to make it relevant and appropriate to the location of the traveler and to the travelers' situation so that the traveler plans appropriately by providing appropriate pre-travel advice related specifically to any intended itinerary, the itinerary becoming a part of the parameter data, which is integrated with the monitoring function including, the system recognizing a developing health, security and other risks in real-time and automatically establishing two-way electronic communication via a broad communications channel incorporating fully redundant mobile text, email, voice and other messaging techniques to transmit and receive acknowledgement for appropriate pre-emptive advice direct to the traveler, as well as permit the traveler to signal an encountered risk, hazard or other event upon which the system may initiate appropriate remedial steps ranging from appropriate advice to commencement of a search and rescue operation in the field.

The system is programmed to receive information about hazardous locations and establish geographical bounds surrounding the hazardous locations and notify a traveler upon entering the geographical bounds of one of the hazardous locations.

A travel safety system comprises a real-time multi component integrated system comprising a multifunction Processing Module. Array (PMA) comprising a plurality of interacting interconnected modules programmed to receive information about hazardous locations and establish geographical bounds surrounding the hazardous locations and notify a traveler upon entering the geographical bounds of one of the hazardous locations.

A real-time multi component travel safety method comprises monitoring and maintaining the safety and security of a traveler, as an individual, part of a group and in a broader corporate context, while traveling, operating and working internationally and domestically utilizing an interactive system comprising:

a multifunction Processing Module Array (PMA) comprising a plurality of interacting interconnected modules, the modules processing Service Requests and delivering appropriate outputs both within the system and to the external service-requesting entity;

a multifunction, programmable and customizable Data Input Bus comprising one of the modules of the Processing Module Array, the Data Input Bus receiving location data, global incident data including disease hazard, natural disaster hazard, terrorist hazard and other hazards, intelligence assessments and other data which are used as parameters controlling the system processes within the Processing Module Array;

a multifunction, programmable and customizable External Service Request Bus (XSRB) comprising another of the modules of the Processing Module Array, the External Service Request Bus accepting service requests, through a GEOS Customer Interface (GCI), from a traveler and from any authorized third party, both in real-time, and passing the service requests on to the Processing Module Array (PMA), the External Service Request Bus being bi-directional and, for some Service Requests, returning appropriate PMA outputs back, via the bi-directional GCI, to the traveler or an authorized third party;

a multifunction and multimedia Communications Bus (COM) comprising another module of the Processing Module Array, the Communications Bus managing communications of the system and its component parts with the external environment;

a multifunction Operation Request Bus (ORB) comprising another module of the Processing Module Array, the Operation Request Bus grouping warning outputs from the Processing Module Array and forwarding the warning outputs to a GEOS GEM Control Center;

a multifunction, programmable and customizable Global Emergency Monitoring (GEM) Center comprising another module of the Processing Module Array, the Global Emergency Monitoring Center responding to and processing Operation Requests from the PMA via the Operation Requests Bus (ORB), interacting with the PMA via the bi-directional SSR bus, responding to, coordinating and processing Traveler Assistance Requests from a GEOS Location Terminal (GLT) or GEOS Communications Terminal (GCT), the GEM initiating further appropriate GEM operations via a GEM Operations Bus (GEMOP bus), which may be supported by further SSRs;

a multifunction, programmable and customizable GEOS Customer Interface (GCI) comprising a bi-directional graphical interface, also accessible via the internet World Wide Web, which is the interface between the user and the System Processes (PROs);

a GEOS Communications Terminal (GCT) comprising an approved technological device enabling communications between the terminal and the other components of the GEOS System, the GCT establishing communications with the GEM and responding to CBS communications, both in real-time;

a GEOS Location Terminal (GLT) comprising an approved technological device transmitting it's location to the GEM or to the FFM, the GLT configured for simultaneously being a GCT;

to create a real-time multi component system that monitors and maintains the safety and security of a traveler, as an individual, part of a group and in a broader corporate context, while traveling, operating and working internationally and domestically.

Processes (PROs) within the PMA interact with the GEM and the external environment via a series of buses including Service Request Buses, Data Input Bus, Operation Request Bus, Communications Bus, the buses comprising logical and physical groupings of signaling paths which provide both clarity and efficiency to the functioning of the system, the utilization of buses in this way enabling the existence and development of multiple logic structures within the same structural connectivity to give rise to possible multiple and different embodiments of the same system and to permit further development of individual system processes and their enhancement and changes to system logic within the structure of the system.

The method further comprising programming the system for being adapted, extended or reduced in scope, without its uniqueness and originality of concept and methodology being fundamentally changed so that the system is structured for learning and thus achieving a modification of process logic within the same structure.

The method further comprises programming the system to communicate with satellite, terrestrial cellular and other techniques and methodologies to acquire Global Incident Data and traveler location data, both in real-time, and to respond to real-time service requests from authorized third parties, from the traveler and from internal monitoring processes in a way where the incoming data is used to modify the response to make it relevant and appropriate to the location of the traveler and to the travelers' situation so that the traveler plans appropriately by providing appropriate pre-travel advice related specifically to any intended itinerary, the itinerary becoming a part of the parameter data, which is integrated with the monitoring function including, the system recognizing a developing health, security and other risks in real-time and automatically establishing two-way electronic communication via a broad communications channel incorporating fully redundant mobile text, email, voice and other messaging techniques to transmit and receive acknowledgement for appropriate pre-emptive advice direct to the traveler, as well as permit the traveler to signal an encountered risk, hazard or other event upon which the system may initiate appropriate remedial steps ranging from appropriate advice to commencement of a search and rescue operation in the field.

A travel safety method comprises programming a real-time multi component integrated system comprising a multifunction Processing Module Array (PMA) comprising a plurality of interacting interconnected modules to receive information about hazardous locations and establish geographical bounds surrounding the hazardous locations and notify a traveler upon entering the geographical bounds of one of the hazardous locations.

In FIGS. 1-12, the present invention comprises a real-time multi-component system and method to monitor and maintain the safety and security of a traveler, whether as an individual, part of a group or in a broader corporate context, while traveling, operating or working internationally and domestically. The system comprises the following parts:

1. Data Input Bus (WIB)

The Data Input bus (DIB) is a logical grouping of signaling paths, which collects real-time external data such as intelligence, global incident and traveler location data. This data is then passed on to the Processing Module Array where it is used to parametrize the system response to a Service Request.

2. External Service Request (XSR)

An External Service Request (XSR) is a request process, from an external source channeled through the GCI that is external to the PMA and is received via the XSRB, to the PMA to execute one of the System Processes.

3. System Service Request (SSR)

A System Service Request is a request process, from a system source other than the GCI that is external to the PMA and is received via the SSRB, to the PMA to execute one of the System Processes.

4. Service Request Bus (SRB)

A service request bus (SRB) is a logical grouping of signaling paths, which accepts service requests and passes these on to the PMA. An SRB may be either an external Service Request Bus (XSRB) or a System Service Request Bus (SSRB).

5. External Service Request Bus (XSRB)

The External Service Request (XSR) bus is a logical grouping of signaling paths, which accepts service requests, through the GCI, from a traveler or from any authorized 3rd party, both in real-time, and passes these on to the Processing Module Array or PMA. The bus is bi-directional and for some Service Requests, returns the appropriate PMA outputs back via the bi-directional GCI, to the traveler or an authorized 3rd party.

6. System Service Request Bus (SSRB)

The System Service Request bus is a logical grouping of signaling paths, which accepts System Service Requests (SSR) from within the System, for example from the GEOS Global Emergency Monitoring Center (GEM), and passes these on to the PMA. The bus is bidirectional and, for some Service Requests, returns the appropriate PMA outputs to the requesting system component.

7. System Process (PRO)

A System Process (PRO) is a process that is executed by one or more of the modules within the PMA and/or the GEM.

8. Operation Request Bus (ORB)

The Operation Request bus (ORB) is a logical grouping of signaling paths, which groups warning outputs from the Processing Module Array and forwards these to the GEOS GEM Control Center.

9. Communications Bus (COM)

The Communications bus is a logical and physical grouping of signaling paths, which manages the communications of the system and its component parts with the external environment.

10. Processing Module Array (PMA)

The Processing Module Array (PMA) contains a series of modules, which are able to process Service Requests and deliver appropriate outputs either within the system or to the external service-requesting entity. Modules, which make UP the array may include (but are not limited to):

a. GEOS Findafone Module (FFM)

The Findafone module (FFM) receives and responds to Service Requests via the two Service Request buses as well as to direct requests from the Critical Broadcast Module. The module processes Service Requests, which include:

i. Assistance Record SSR (SR 1 in FIG. 1)—inbound;
    ii. Location Request XSR/SSR (SR 2 in FIG. 1)—bi-directional;
    iii. Hazard Alert Request SSR (SR 3 in FIG. 1)—bi-directional
    iv. Group SMS Request XSR/SSR (SR 4 in FIG. 1)—bi-directional The Findafone module is interlinked with the Critical Broadcast System (CBS) Module both by an internal communications bus (ICB) and via the SSR bus.

b. Critical Broadcast System (CBS) Module

The Critical Broadcast System module (CBS) responds to GEM service requests via the SSR bus. In the case of specific authorized 3rd parties, these may also access the CBS via the XSR bus. The CBS communicates internally with the FFM to obtain and record the locations of travelers that are subject to a CBS service request, The responses to the GEM are via the bidirectional CBS service request on the SSR bus. A CBS service request establishes 2-way, verifiable and auditable communications between the GEM and one or many travelers via their CCTIGLT. The CBS module processes Service Requests; which include:

i. CBS XSRISSR (SR 5 in FIG. 1)—bi-directional;
    ii. ICE service request—bi-directional.

c. Knowledge Foundation Module (KFM)

The Knowledge Foundation (KFM) module is a logical grouping of processes and dynamic data which responds to and processes both external and system service requests via the XSR and SSR buses as appropriate. The KFM data is dynamic as it also receives real-time data via the Data Input bus. The KFM processes Service Requests, which Include:

i. Destination Intelligence XSR/SSR (SR 7 in FIG. 1)—bi-directional;
    ii. Security Advice XSR/SSR (SR 8 in FIG. 1)—bi-directional.

The KFM is also able to instigate, via the VCM, an internal Security Services request direct to the Security Incident Management (SIM) module.

d. Virtual Consultant Module (VCM)

The Virtual Consultant (VCM) module is a logical grouping of processes and data which responds to and processes both external and system service requests via the XSR and SSR buses as appropriate. The VCM processes Service Requests, which include:

i. Destination Intelligence XSR/SSR (SR 7 in FIG. 1)—bi-directional;
    ii. Security Advice XSR/SSR (SR 8 in FIG. 1)—bi-directional.

The VCM is also able to instigate an internal Security Services request direct to the Security Incident Management (SIM) module.

e. Security Incident Management (SIM) Module

The Security Incident Management (SIM) module is a logical grouping of processes and data, which responds to and processes System Service Requests (SSRs) from the GEM and also Internal Service Requests from the VCM. The SIM module processes Service Requests, which include:

i. Security Services SSR (SR 9 in FIG. 1);
    ii. Internal VCM service request.

f. Sign-In-Safe Module (SIS)

The Sign-In-Safe (SIS) module is a logical grouping of processes and data, which responds to and processes SSRs and/or XSRs from authorized 3rd parties via the XSR bus. The SIS module processes Service Requests, which include:

i. Sign-in-Safe XSR/SSR (SR 6 in FIG. 1)—bi-directional.

The SIS module may also generate a Traveler Warning Operation Request via the Operation Request Bus (ORB) to the GEM.

11. Global Emergency Monitoring (GEM) Center

The Global Emergency Monitoring (GEM) center is a logical grouping of processes and data, which responds to and processes Operation Requests from the PMA via the Operation Requests Bus (ORB), interacts with the PMA via the bi-directional SSR bus, responds to, coordinates, and processes Traveler Assistance Requests from a GEOS Location Terminal (CLT) or CEO5 Communications Terminal (CCT). The GEM may then initiate further appropriate GEM operations via the GEM Operations Bus (GEMOP bus), which may be supported by further SSRs.

12. GEOS Customer Interface (GCI)

The GEOS Customer Interface (CCI) is a bi-directional graphical interface, also accessible via the internet World Wide Web, which translates user operator actions into XSRs, via the XSRB, to the PMA and is the interface between the user and the System Processes (PROS).

13. GEOS Communications Terminal (GCT)

A GEOS Communications Terminal (GCT) is an approved technological device, which enables the establishment of communications between the terminal and the other components of GEOS System. In particular, a GCT can establish communications with the GEM and/or respond to CBS communications, both in real-time.

Examples of a GCT include the following:

a. Terrestrial cellular communications terminal;
    b. Satellite communications terminal;
    c. Personal Data Assistant devices or similar with wireless and/or cellular communications channels. Examples of such devices may include:
    i. Mobile phone;
    ii. SmartPhone;
    iii. Blackberry.

14. GEOS Location Terminal (GCT)

A GEOS Location Terminal (GLT) is an approved technological device, which may transmit it's location to the GEM or to the FFM. A GLT may simultaneously be a GCT. Examples of a CLT include the following:

a) Terrestrial cellular communications terminal with satellite-positioning enabled b) Terrestrial cellular communications terminal without satellite-positioning but with terrestrial cellular network location support;

c) Satellite communications terminal with satellite-positioning enabled;

d) Personal Data Assistant devices or similar with wireless and/or cellular communications channels and with satellite-positioning enabled. Examples of such devices may include:
   i. SmartPhone;
   ii. Blackberry.

15. Internal Communications Bus (ICB)

The Internal Communications Bus is a logical and physical grouping of signaling paths, which manages the communications between system components within the PMA, The bulk of these communications are between the FFM and CBS modules. The ICB is interconnected with the Communications Bus (COM) to enable the execution of communications between the system and the external environment.

The System consists of multiple processes, the System Processes (PROS), being executed dynamically and concurrently within the PMA and between the PMA and GEM. This continuous, concurrent, real-time multiple process execution provides the means to provision the monitoring and maintenance of the safety and security of a traveler in real-time.

The System provides monitoring and maintenance of the security and safety of a traveler by allowing any authorized 3rd Party or a traveler to interact with the System as well as allowing the System to react in real-time to the inbound stream of Intelligence information and Initiate the pushing of warnings and other actions to a Traveler (see FIG. 2). An authorized 3rd Party or traveler, are able to interact with the System by issuing Service Requests via the GEOS Customer Interface (GCI). The GCI generates appropriate XSRs, via the XSRB, to an appropriate module in the PMA. The relevant module process then causes an XSR response (r-XSR) to be relayed back to the request originator via the bi-directional XSRB and the GCI or it may be the case that the response may generate an Operation Request, via the ORB, to the GEM or, indeed, a communication via the Communication bus. The GEM may further interact with the PMA via SSRs through the SSRB before executing a GEMOP via the GEMOP bus.

Additionally a traveler may, via their GLTIGCT, interact directly via the Communications Bus (COM) with the GEM Center, which may Interact with the PMA via SSRs through the SSRB before executing a GEMOP via the GEMOP bus.

Service Requests (either External or Internal) are passed to the Processing Module Array via the two Service Request Busses. The PMA system processes (PROs) utilize the data entering the PMA via the Data Input Bus (DIE) and result in outputs either via the bi-directional SRBs, the Operation Request Bus (ORB) or the bi-directional Communications Bus (COM).

The system processes (PROs) within the PMA Interact with the GEM and the external environment via a series of buses (Service Request Buses, Data Input Bus, Operation Request Bus, Communications Bus etc.). These buses are logical and physical groupings of signaling paths, which provide both clarity and efficiency to the design however, the use of buses in this way enables the existence and development of multiple logic structures within the same system structural connectivity. This gives rise to possible multiple and different embodiments of the same invention. This also permits the further development of the individual system processes, their enhancement and changes to system logic within the structure of the invention.

The concurrently executable system processes (PROS), which constitute the System include the following:

(1) Assistance Request (SR 1, 7, 9, etc.)

A Traveler requests assistance via their GLT, which communicates an instant flash message to the GEM. The message contains the identifier (ID) of the GLT (which may, for example, be a phone number) and the geographical position (latitude, longitude) of the GLT at the time of the flash message. The GEM immediately and automatically generates an Assistance Record SSR (SR 1 in FIG. 1), via the SSRB to the FFM which updates the GLT location database. The GEM may then open a bi-directional communications channel with the GLT (voice, SMS text, PIN-PIN or other) and issue further SSRs to appropriate PMA modules, such as, for example, KFM (SR 7 in FIG. 1) or SIM via SSRs (SR 9 in FIG. 1) to obtain assessment data. The GEM then instigates an appropriate GEMOP, which may include, but is not limited to, such operations as Search & Rescue, Political Evacuation, other Security Operations or other operations such as, for example, an appropriate Medical Emergency response. See FIG. 3.

(2) Assistance Notification

A Traveler may issue an Assistance Notification via their CLT, which communicates an instant flash message (a), via the COMMs bus direct to the FFM module (b) within the PMA. The FFM module internal process (c) generates a location request (LOC) to the GLT, accepts LOC data via the Dl6 (d) and generates multiple Assistance Notifications (e) via the COM bus to other CLTs or CCTs (f) as defined in the FFM Database. The GEM is not involved in this process. See FIG. 4.

(3) Security Advice Request (SR 8 in FIG. 1)

A Traveler or Authorized 3rd Party may generate a Security Advice Request via the GCI. The GCI generates a Security Advice XSR, via the XSRB, to the VCM. Depending upon the precise nature of the XSR, the VCM may either respond directly with an r-XSR via the XSRB back to the GCI or the VCM may refer the request to the SIM. The SIM process analyzes the XSR and, following analysis, may generate a Security or Traveler Warning, via the ORB to the GEM. The GEM may then generate a CEMOP via the GEMOP bus. See FIG. 5.

(4) Destination Intelligence Request (SR 7 in FIG. 1)

A Traveler or Authorized 3rd Party may generate a Destination Intelligence Request via the GCI. The GCI generates a Destination Intelligence Request XSR, via the XSRB, to the KF module. The KF module logic either generates an r-XSR response back, via the XSRB, to the CCI and the user or in certain circumstances, may refer the processing of the request to the VCM. The VCM, in turn, depending on the situation, will either generate an r-XSR response, via the KF and XSRB, back to the GC1 and the user or may refer processing to the SIM. This, in turn, will generate an appropriate warning and operation request via the ORB to the GEM. The GEM will initiate an appropriate GEMOP. See FIG. 6.

(5) External Location Request (SR 2 in FIG. 1)

A Traveler or Authorized 3rd Party may generate a Location Request via the CCI. The GC1 generates a Location Request (2), via the XSRB, to the FFM. The FFM obtains a GLT location via the DIE and generates an r-XSR response back to the GCI via the XSRB. See FIG. 7.

(6) System Location Request (SR 2 in FIG. 1)

The GEM may generate a Location Request (an SSR) directly to the SSRB. The GEM generates a Location Request (2), via the SSRB, to the FFM. The FFM obtains a GLT location via the DIB and generates an r-XSR response back to the GEM via the SSRB. See FIG. 8.

(7) Group SMS Request (SR 4 in FIG. 1)

A Traveler or Authorized 3rd Party may generate a Group SMS (text message) Request via the GCI. The GCI generates a Group SMS Request (SR 4 in FIG. 1), via the XSRB, to the FFM. The FFM collects appropriate message destination data from the GCI, across the XSRB and then transmits the message, via the COM to all relevant GLTIGCT devices. GLT/GCT may acknowledge or respond to the messages via the reply channel, which transmits the reply, via an r-XSR across the XSRB back to the GCI and the user. See FIG. 9.

(8) Sign-In-Safe Request (SR 6 in FIG. 1)

A Traveler or Authorized 3rd Party generate Sign-In-Safe (SIS) XSRs across the XSRB and either update the SIS database or interrogate it. The SIS collects appropriate traveler itinerary data and verifies that the Traveler is on schedule responding, via an r-XSR across the XSRB back to the GCI and the user, If the Traveler ceases to be on schedule, the SIS module generates a Traveler Warning, via the ORB to the GEM. The GEM then responds with an appropriate GEMOP. See FIG. 10.

(9) Critical Broadcast Request (SR 5 in FIG. 1)

Authorized 3rd Party access to this XSR is provided by the CC1, via the XSRB. The XSR provides the appropriate destination and message parameters to the CBS module. The CBS and FFM communicate via the ICB to obtain locations for the CLT/GCT devices being contacted. R-XSR responses are transmitted back, via the XSRB, to the CC1 providing full audit and acknowledgement for each GLT/CCT device contacted, together with a record of the GLT/GCT location at the time of contact. See FIG. 11.

(10) Hazard Alert Monitor Process

This is a continuous, recurring, real-time process. Real-time data relating to global incidents (disease outbreaks, natural disasters such as earthquakes or tsunami, terrorist threat, public disorder etc.), GLT/GCT location data and other intelligence enters the system via the Data Input Bus (DIB) and enters the PMA. As an example, GLT/GCT location data is forwarded to the FFM, whereas global incident data is transferred to the KFM and to the SIM, where it is interpreted by a range of processes. If the event referred to by the incident data is above a system-defined threshold, the SIM generates a Hazard Warning, via the ORB to the GEM, The GEM then issues a Hazard Alert (SR 3 in FIG. 1) across the SSRB to the FFMICBS modules detailing the nature of the Alert and specific and immediate advice for the Traveler to act on. The FFM transfers CLTIGCT data for all devices in the geographical area affected by the alert to the CBS, which transmits a Critical Alert Message (CAM) to all affected GLT/GCT devices via a bi-directional, real-time protocol. As individual GLT/GCT devices acknowledge receipt of the CAM, the acknowledgements and any other communications from notified GLT/CCTs generate response r-SSRs, via the SSRB, back to the GEM thus providing a complete audit trail for CAM delivery on a user by user (CLT/GCT) basis. See FIG. 12.

The objective of the invention is primarily to provide information and protection to travelers. It will be seen that by varying the type of intelligence or information supplied to the end user through the Knowledge Foundation and intelligence channels and pushed through communications the system may be easily adapted for use by professionals and workers domestically e.g. for use by realtors the available information may contain local information relative to crime levels, demographics, and recent sales prices of local property as well as warnings of unsafe localities. The satellite and GEM systems may be set to a default Geo fencing that automatically alerts the end user that they are entering a known dangerous area, etc. The Sign in Safe component may be utilized for registering departure by a lone worker to a local destination for the purposes of meeting a prospective client thus registering anticipated movements and times with an alarm being triggered in the event of an overdue "Sign in" This may then activate the location technology and search and rescue and security service modules. All this may be achieved without altering the basic method and processes of the invention but merely by varying the parameters of utilization. Thus lone workers such as social services staff, probation officers, police officers away from vehicle communications systems, etc. etc. may take advantage of the benefits of the invention. It will be seen therefore that multiple and almost unlimited use may be made of the Invention with minor adaptations.

The system processes (PROS) within the PMA interact with the GEM and the external environment via a series of buses (Service Request Buses, Data Input Bus, Operation Request Bus, Communications Bus etc.). These buses are logical and physical groupings of signaling paths, which provide both clarity and efficiency to the design of the system, however, the system processes could be connected directly without recourse to a bus structure. This would permit the definition of one particular embodiment of the system, for example, the FFM, CBS, SIS and SIM modules could be connected directly to the GEM, similarly, the GEM could have it's own communications as well as the FFM and CBS modules. This would be a particular embodiment of the invention.

The concept, methods and processes currently described are entirely original and unique. The Invention is capable of being adapted, extended or reduced in scope, without Its uniqueness and originality of concept and methodology being fundamentally changed. This may be achieved, for example, by modifying, adapting and adding to the PMA processes and the PMA logic in the light of further experience. In this way, the invention is capable of learning and thus achieving a modification of process logic, within the same structure. Ongoing development of the invention by the patent applicant continues.

It is understood that the preceding description is given merely by way of illustration and not in limitation of the invention and that various modifications may be made thereto without departing from the spirit of the invention as claimed.

What is claimed is:

1. A real-time multi component travel safety system that monitors and maintains the safety and security of at least one traveler, the system comprising:
   a multifunction Processing Module Array (PMA) comprising a plurality of interacting interconnected modules, the modules processing Service Requests and delivering outputs based on the processed Service Requests both within the system and to an external service-requesting entity;
   a multifunction, programmable and customizable Data Input Bus comprising one of the modules of the PMA, the Data Input Bus receiving location data, intelligence assessment data, and global incident data, the global incident data including hazard data indicating one or more of a disease hazard, a natural disaster hazard, and a terrorist hazard, the received data being used as parameters controlling system processes within the PMA;

a multifunction, programmable and customizable External Service Request Bus comprising another of the modules of the PMA, the External Service Request Bus accepting service requests in real-time, through a Customer Interface, from the at least one traveler and from an authorized third party and passing the accepted service requests on to the PMA, the External Service Request Bus being bi-directional and, for some Service Requests, returning PMA outputs back, via the Customer Interface, to the at least one traveler or the authorized third party;

a multifunction and multimedia Communications Bus comprising another module of the PMA, the Communications Bus managing communications of the system with an external environment;

a multifunction Operation Request Bus (ORB) comprising another module of the PMA, the ORB grouping warning outputs from the PMA and forwarding the warning outputs to a multifunction, programmable and customizable Global Emergency Monitoring (GEM) Center comprising another module of the PMA, the GEM Center responding to and processing Operation Requests from the PMA via the ORB, interacting with the PMA via a bi-directional System Service Request bus, responding to, coordinating and processing Traveler Assistance Requests from a Location Terminal or a Communications Terminal; and wherein the Communications Terminal is configured for communications with the GEM and responding to critical broadcast system communications, both in real-time;

wherein the Location Terminal is configured to transmit an indication of a location of the Location Terminal to the GEM Center or another portion of the system; and wherein the real-time multi component travel safety system monitors and maintains the safety and security of the at least one traveler, as an individual or part of a group, while traveling, operating or working internationally or domestically.

2. The system of claim 1 wherein processes within the PMA interact with the GEM Center and the external environment via a series of buses including a Service Request Bus, a Data Input Bus, an Operation Request Bus, and a Communications Bus, the buses comprising logical and physical groupings of signaling paths which provide both clarity and efficiency to the functioning of the system, the buses enabling the existence and development of multiple logic structures within the same structural connectivity to give rise to possible multiple and different embodiments of the same system and to permit further development of individual system processes and their enhancement and changes to system logic within the structure of the system.

3. The system of claim 1 wherein the system is programmed to:

acquire Global Incident Data and traveler location data, both in real-time;

respond to real-time service requests from the authorized third party, from the at least one traveler and from internal monitoring processes in a way where incoming data is used to modify the response to make it relevant and appropriate to the location of the at least one traveler and to a situation of the at least one traveler by providing pre-travel advice related specifically to an intended itinerary of the at least one traveler, the intended itinerary becoming a part of the parameter data, which is integrated with the monitoring processes;

recognize a developing risk in real-time, the developing risk including at least one of a health risk and a security risk; and automatically establish two-way electronic communication via a broad communications channel incorporating at least one of fully redundant mobile text, email, and voice messaging techniques to transmit and receive acknowledgement from the at least one traveler, and to permit the at least one traveler to signal an encountered risk, hazard or an event upon which the system may initiate responsive remedial steps, the remedial steps including at least one of advice for the at least one traveler and commencement of a search and rescue operation in the field.

4. The system of claim 1 wherein the system is programmed to receive information about hazardous locations and establish geographical bounds surrounding the hazardous locations and notify the at least one traveler upon the at least one traveler entering the geographical bounds of one of the hazardous locations.

5. A travel safety method, comprising:

processing service requests and delivering outputs based on the processed service requests;

receiving location data, intelligence assessment data, and global incident data, the global incident data including hazard data indicating one or more of a disease hazard, a natural disaster hazard, and a terrorist hazard;

using the received data as parameters for controlling system processes within a multifunction processing module array (PMA) comprising a plurality of interacting interconnected modules;

receiving service requests in real-time from a traveler or from an authorized third party and passing the received service requests on to the PMA;

for at least some of the received service requests, returning PMA outputs back to the traveler or the authorized third party;

grouping warning outputs from the PMA and forwarding the warning outputs to a global emergency monitoring (GEM) center;

processing and responding to operation requests from the PMA at the GEM center;

responding to, coordinating and processing traveler assistance requests from a location terminal or a communications terminal, wherein the communications terminal is configured for communications with the GEM and responding to critical broadcast system communications, both in real-time, and wherein the location terminal is configured to transmit an indication of a location of the location terminal to the GEM center; and monitoring and maintaining the safety and security of at least one traveler, as an individual or part of a group, while traveling internationally or domestically.

6. The method of claim 5, wherein receiving service requests from a traveler comprises receiving at least one of:

an assistance request, a security advice request, a destination intelligence request, an external location request,
a system location request,
a group short message service request,
a sign-in safe request, and
a critical broadcast request.

* * * * *